United States Patent [19]

Bourdois et al.

[11] 4,261,713
[45] Apr. 14, 1981

[54] APPARATUS FOR THE SEPARATION AND RECOVERY OF A SOLID PRODUCT TRANSPORTED BY A GAS

[75] Inventors: Claude Bourdois, Palaiseau; Maurice Decolle, Morangis; Michel Ferard, Sartrouville; Paul Marchal, Gif-sur-Yvette; Silviu Vais, Bourg la Reine, all of France

[73] Assignee: Commissariat a l'Energie Atomique, Paris, France

[21] Appl. No.: 65,544

[22] Filed: Aug. 10, 1979

[30] Foreign Application Priority Data

Aug. 11, 1978 [FR] France .................. 78 23737

[51] Int. Cl.³ .................. B01D 46/04; B01D 50/00
[52] U.S. Cl. .................. 55/302; 55/325; 55/337; 55/349; 55/350; 55/368; 55/379; 55/423; 55/381; 55/521; 55/DIG. 9
[58] Field of Search .................. 55/288, 302, 321–324, 55/334, 337, 343, 346, 349, 350, 368, 379, 423, 492, 521, DIG. 9, 491, 525, 381, 382, 325, 315

[56] References Cited

U.S. PATENT DOCUMENTS

| | | | |
|---|---|---|---|
| 1,856,685 | 5/1932 | Anderson | 55/321 |
| 1,887,052 | 11/1932 | Wendelin | 55/521 |
| 2,573,844 | 11/1951 | Hersey, Jr. | 55/379 |
| 2,836,256 | 5/1958 | Caskey | 55/324 |
| 2,906,371 | 9/1959 | Jones | 55/381 |
| 3,653,190 | 4/1972 | Lee et al. | 55/337 |
| 3,732,075 | 5/1973 | Acaba | 55/334 |
| 3,737,074 | 6/1973 | Davies | 55/337 |
| 3,789,587 | 2/1974 | Moorefield | 55/525 |
| 3,951,630 | 4/1976 | Kleissler, Jr. | 55/381 |

FOREIGN PATENT DOCUMENTS

| | | | |
|---|---|---|---|
| 247590 | 4/1926 | United Kingdom | 55/368 |
| 274881 | 4/1926 | United Kingdom | 55/343 |
| 737457 | 9/1955 | United Kingdom | 55/337 |

*Primary Examiner*—David L. Lacey

[57] ABSTRACT

Apparatus for the separation and recovery of a solid product transported by a gas, wherein said apparatus comprises at least one filter cartridge made from a rigid porous material mounted in a sealed enclosure and defining in the latter a first filter chamber within the at least one cartridge and which communicates by its lower end with a tube for the collection of the separated solid product and a second chamber for the collection of the filtered gas outside the said at least one cartridge, the latter having two large-surface opposite porous walls maintained with an appropriate spacing by spacers fixed on the said walls and disposed in the filter chamber in such a way as to form deflectors, means for introducing the gas transporting the solid product to be separated into the said filter chamber and means for extracting the filtered gas from the collection chamber.

9 Claims, 6 Drawing Figures

APPARATUS FOR THE SEPARATION AND RECOVERY OF A SOLID PRODUCT TRANSPORTED BY A GAS

BACKGROUND OF THE INVENTION

The present invention relates to an apparatus for the separation and recovery of a solid product transported by a gas and usable more particularly for the recovery of radioactive particles, such as plutonium oxide powder present in a gas flow.

More specifically it relates to a separation apparatus having at least one filter cartridge made from a porous material into which is introduced the gas transporting the solid product to be separated in such a way as to retain the latter within the cartridge and to purify the gas by passage through the cartridge wall.

The presently known filtering apparatuses of this type generally comprise one or more cylindrical filter cartridges within which circulates the gas transporting the solid product to be separated, the latter then being optionally recovered in a container positioned below the cartridges, which are unclogged for example by means of a gas flowing in a direction counter to the flow of the gas transporting the solid product or by mechanical shaking or by both these actions together.

Static apparatuses of this type have the disadvantage of not being usable with complete safety and under completely satisfactory reliability conditions for carrying out the separation of fissile products transported by pneumatic means or radioactive products when they are constituted by materials which are degraded under the action of radiation or heat. In the case of fissile products the geometry conditions which have to be fulfilled lead to difficulties in connection with the flow and recovery of the powders, as well as to unclogging problems.

BRIEF SUMMARY OF THE INVENTION

The present invention relates to an apparatus for the separation and recovery of a solid product transported by a gas and which obviates the above disadvantage.

The present invention therefore relates to an apparatus for the separation and recovery of a solid product transported by a gas, wherein it comprises at least one filter cartridge made from a rigid porous material mounted in a sealed enclosure and defining in the latter a first filter chamber within the cartridge and which communicates by its lower end with a tube for the collection of the separated solid product and a second chamber for the collection of the filtered gas outside the said cartridge, the latter having two large-surface opposite porous walls maintained with an appropriate spacing by spacers fixed on the said walls and disposed in the filter chamber in such a way as to form deflectors, means for introducing the gas transporting the solid product to be separated into the said filter chamber and means for extracting the filtered gas from the collection chamber.

Advantageously the apparatus also comprises means for introducing a gas flow into the collection chamber in a direction to bring about the unclogging of the filter cartridge.

The apparatus as defined hereinbefore has the advantage of being particularly suitable for the separation of particles of fissile products transported by a gas flow. Thus, due to the presence of the spacers which give the filter cartridge assembly completely satisfactory properties as regards mechanical strength and pressure behavior, said cartridge can have a large filter surface area, while defining a thin filter chamber in order to satisfy safety requirements in connection with criticality.

Moreover, the presence of suitably positioned spacers within the filter chamber contributes to the separating action, due to the impact or friction of solid particles thereon.

In addition, said apparatus also has the advantage of being able to operate in a corrosive atmosphere, at elevated temperature and in the presence of radioactive substances, because the complete apparatus can be made from a corrosion-resistant, radiation-resistant and heat-resistant material, e.g. stainless steel.

According to a preferred embodiment of the apparatus according to the invention the filter cartridge has, at least in its lower part, a cross-section which increases rapidly from its lower end to its upper end.

Preferably, in this embodiment, the two opposite porous walls of the filter cartridge are parallel and, at least in their lower parts, substantially have the shape of a triangle, whose apex is directed towards the lower end of the cartridge and whose two walls are joined together at least on their lateral edges by porous material elements.

This embodiment of the apparatus according to the invention is particularly advantageous because, by introducing the gas flow which transports the solid product to be separated into a filter chamber whose cross-section increases rapidly in the vicinity of the gas flow inlet, a rapid decrease in the speed of the gas flow is brought about, which improves the separating action obtained.

Moreover, when in this embodiment the apparatus comprises means for introducing a gas into the collection chamber during the unclogging of the filter cartridge under the action of the gas introduced into said chamber it is possible to recover the separated solid product in the filter chamber by making it drop freely onto a highly sloping fluidised bed which converges towards the collection tube.

In this case, during unclogging, a gas is introduced into the collection chamber under a pressure which is selected as a function of the slope of the filter cartridge walls in order to create on the latter a fluidised bed, in such a way that the powder which has fallen onto the inclined walls of the cartridge drops in the form of a fluidised bed towards the extraction tube and consequently towards a recovery tank. The gas is introduced in such a way that it creates a distributed gas flow perpendicular to the wall.

According to another feature of the apparatus according to the invention the spacers advantageously comprise an undulating plate provided with openings, or an undulating plate in which there are inlets, said undulating plate being alternately connected by the apex of said undulations with both the said walls in such a way as to form in the filter chamber vertically extending channels, while ensuring a good mechanical performance of the apparatus.

According to a variant the spacers comprise profiled members mounted between the walls in such a way as to oppose the rising of the solid product into the filter chamber and so as to ensure a good mechanical performance of the assembly.

Advantageously these members are shaped like triangular prisms and are arranged in rows between the walls, the members of one row being staggered relative to the members of the adjacent row and each member in one row is oriented in such a way that one of the lateral faces of the prism is surmounted by a ridge.

BRIEF DESCRIPTION OF THE DRAWINGS

The invention is described in greater detail hereinafter with reference to non-limitative embodiments and the attached drawings, wherein.

DETAILED DESCRIPTION OF THE PREFERRED EMBODIMENTS

Figure 1:
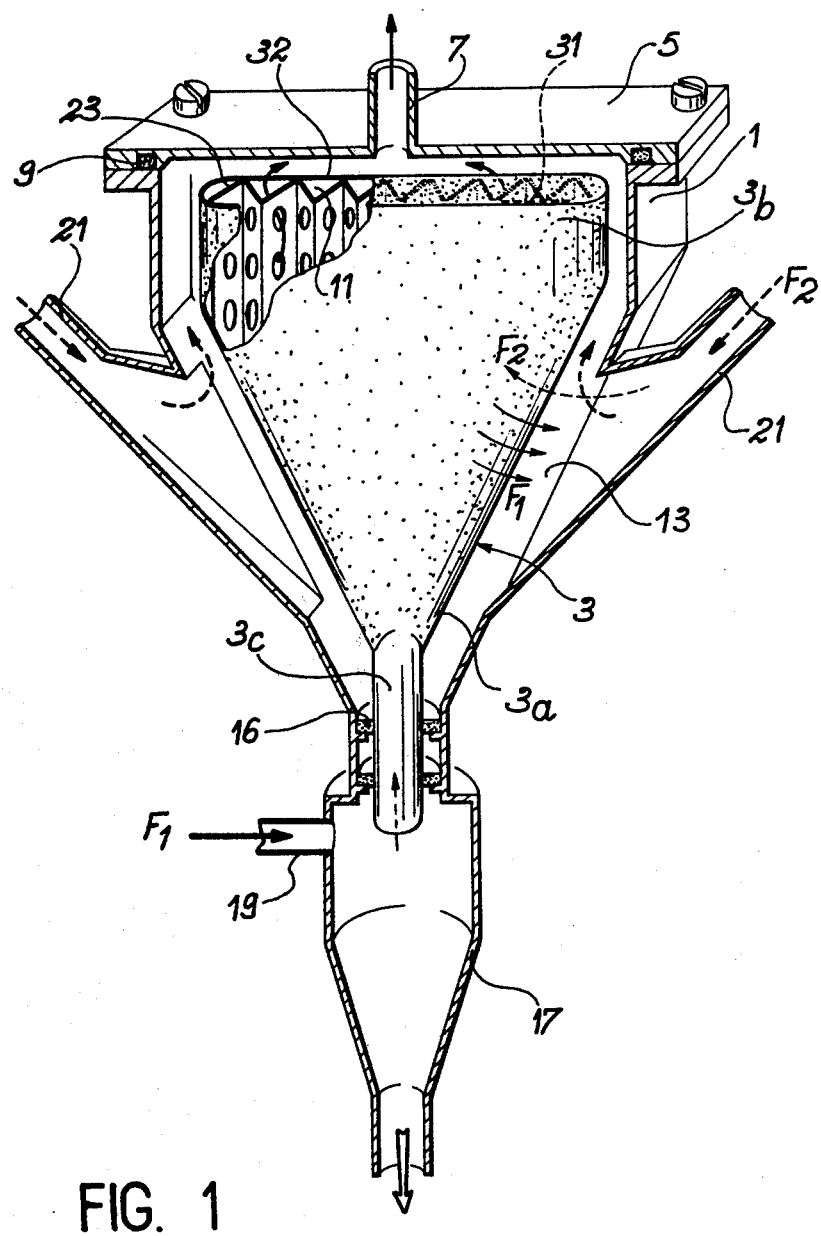
FIG. 1 shows a diagrammatic perspective representation of the apparatus according to the invention.

On referring to FIG. 1 it is possible to see that the apparatus according to the invention comprises an enclosure 1 within which is vertically mounted a filter cartridge 3. The enclosure 1 is made, for example, from mechanically welded sheets provided with external reinforcements and of appropriate thickness to resist pressure and vacuum forces, while it is closed in its upper area by a sealed or detachable cover 5 provided with an outlet 7, sealing between enclosure 1 and cover 5 being ensured by a joint 9.

The rigid filter cartridge 3 is sealingly mounted by means of a joint 16 and defines in enclosure 1 a first filter chamber 11 within the cartridge and a second collection chamber 13 outside the cartridge sand surrounding the latter.

The filter chamber 11 communicates by its lower end which is in the form of a pipe 3c with a collection tube 17 into which issues a duct 19 for the introduction of the gas transporting the solid product to be separated.

Advantageously duct 19, collection tube 17 and pipe 3c are arranged so as to form a cyclone, which also participates in the separation of the solid particles.

Two ducts 21 open out onto the side walls of the enclosure and by means of said ducts it is possible to introduce into collection chamber 13 a gas flow in order to bring about the unclogging of the filter cartridge 3.

According to the invention filter cartridge 3 has two large surface area opposite walls 31 and 32 maintained with a desired spacing by spacers 23 welded to the said plates and provided within the filter chamber 11 on the one hand for improving the mechanical behavior of the filter cartridge, particularly the strength of walls 31 and 32 with a view to withstanding overpressures and vacuum and on the other hand to act as deflectors in the path of the gas flow circulating in said chamber.

In the embodiment illustrated in this drawing walls 31 and 32 are also maintained parallel to one another and in their lower portion are essentially shaped like a large area triangle, whose apex is connected to pipe 3c. Thus, *filter chamber 11 has a small cross-section in the vicinity of the gas inlet transporting the solid product to be separated and its cross-section regularly and rapidly increases up to the vicinity of its upper end 3b.* Moreover, it should be noted that these walls constitute large filtering surfaces which can be maintained at a limited spacing in order to satisfy safety requirements when the apparatus is to be used for separating radioactive or fissile products.

A rigid filter cartridge of this type can for example be made from two plates of porous material substantially shaped like a triangle in their lower part and shaped like a rectangle in their upper part, said plates being interconnected on their lateral edges and at their upper end by members made from the same porous material in order to form a filter cartridge closed at its upper end and open at its lower end.

Optionally the filter cartridge cna be directly closed at its upper end by cover 5 and in this case outlet 7 is positioned on one of the side walls of the enclosure.

The porous material used for the manufacture of the filter cartridge is chosen as a function of the nature of the gas and the solid product to be separated and it has porosity and permeability characteristics adapted to the size of the particles of the solid product to be recovered. This rigid material can be in the form of a porous or alveolar metal, for example fritted stainless steel.

The apparatus functions in the following manner. The gas transporting the solid product to be separated is introduced by duct 19. This gas then rises in the filter chamber 11 in which the particles are separated by the gas passing through the filter cartridge walls and are further separated in the filter chamber under the action of the rapid reduction in the speed of the gas flow and the effects of impacts and friction of the particles on spacers 23. The filtered gas is collected by following the direction of arrows $F_1$ in collection chamber 13 and is then evacuated by outlet 7, while the solid particles are recovered in collection tube 17.

In order to ensure the unclogging of the cartridge the introduction of the gas flow transporting the solid product to be separated is interrupted and outlet 7 is blocked, after which a gas counterflow is introduced through ducts 21 and by following arrows $F_2$ ensures the unclogging of the filter cartridge and the discharge of the solid product into tube 17. The powder expelled by the gas counterflow and suspended in the filter drops towards the bottom of the latter. Thus, it is directed towards the inclined rigid porous material passages which converge towards the powder extraction pipe 3c. The pressure necessary for the unclogging of the filter produces in said passage, as over the complete surface of the porous material, a distributed gas flow perpendicular to the wall preventing the powder from being redeposited in the form of a pile or from being reabsorbed by the filtering substrate of the said passage. The flow rate and direction of this gas flow are such that in this way a fluidised bed is formed which makes the powder drop towards the extraction pipe 3c and therefore towards the recovery tank. After unclogging the filter the gas is discharged through outlet 7.

Figure 2:
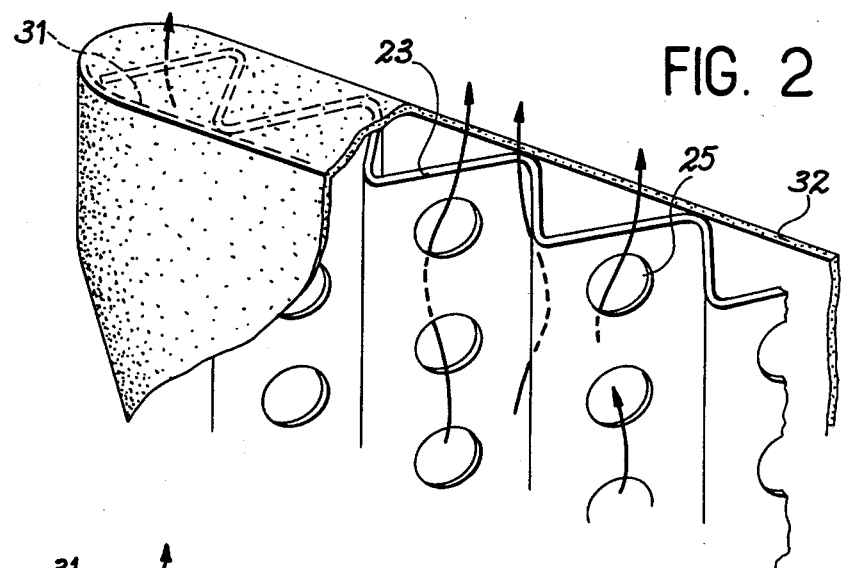
FIG. 2 shows a first embodiment of the spacers mounted in the filter cartridge of the apparatus according to the invention.

On referring to FIG. 2 it can be seen that the spacers are constituted by an undulating plate 23 having circular openings 25, whereby said undulating plate is alternately in contact by the apex of its undulations with the two opposite walls 31 and 32 of the filter cartridge and is fixed to the latter, e.g. by spot welding.

Thus, in the filter chamber channels are defined which extend in a vertical direction. The gas transporting the solid product to be separated introduced into filter chambers 11 is firstly directed in the central channels and is then laterally distributed by passage through openings 25. This leads to a certain impact and friction action during the changes of direction and thus aids the separation of the solid product transported by the gas.

Figure 3:
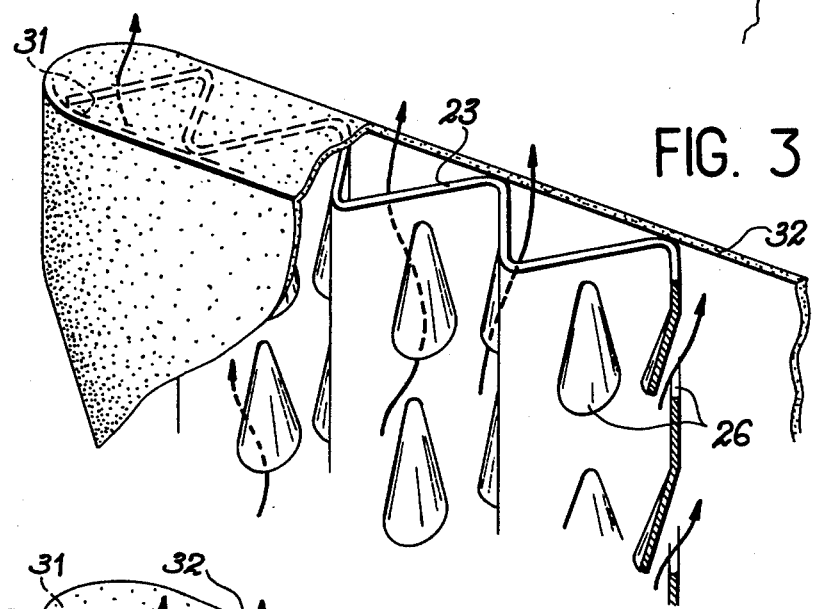
FIG. 3 shows a second embodiment of the spacers.

FIG. 3 shows a spacer of the same type as in FIG. 2, said spacer also being formed by an undulating plate 23 in which there are inlets 26, which increases the impact action of the solid particles on the spacers.

Figure 4:
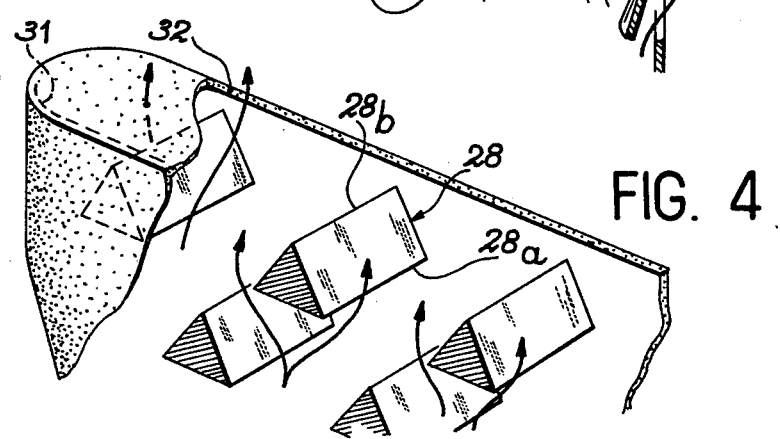
FIG. 4 shows a third embodiment of the spacers.

FIG. 4 shows another embodiment of the spacers, which comprise profiled members 28 shaped like triangular prisms mounted between the two opposite walls 31 and 32 in such a way as to form rows in which the members of one row are staggered with respect to the members of adjacent rows. The members 28 are oriented in such a way that one of the faces of prisms 28 is surmounted by a ridge 28b. This orientation has the advantage of aiding, during unclogging, the dropping of the solid product towards the collection tube.

Figure 5:
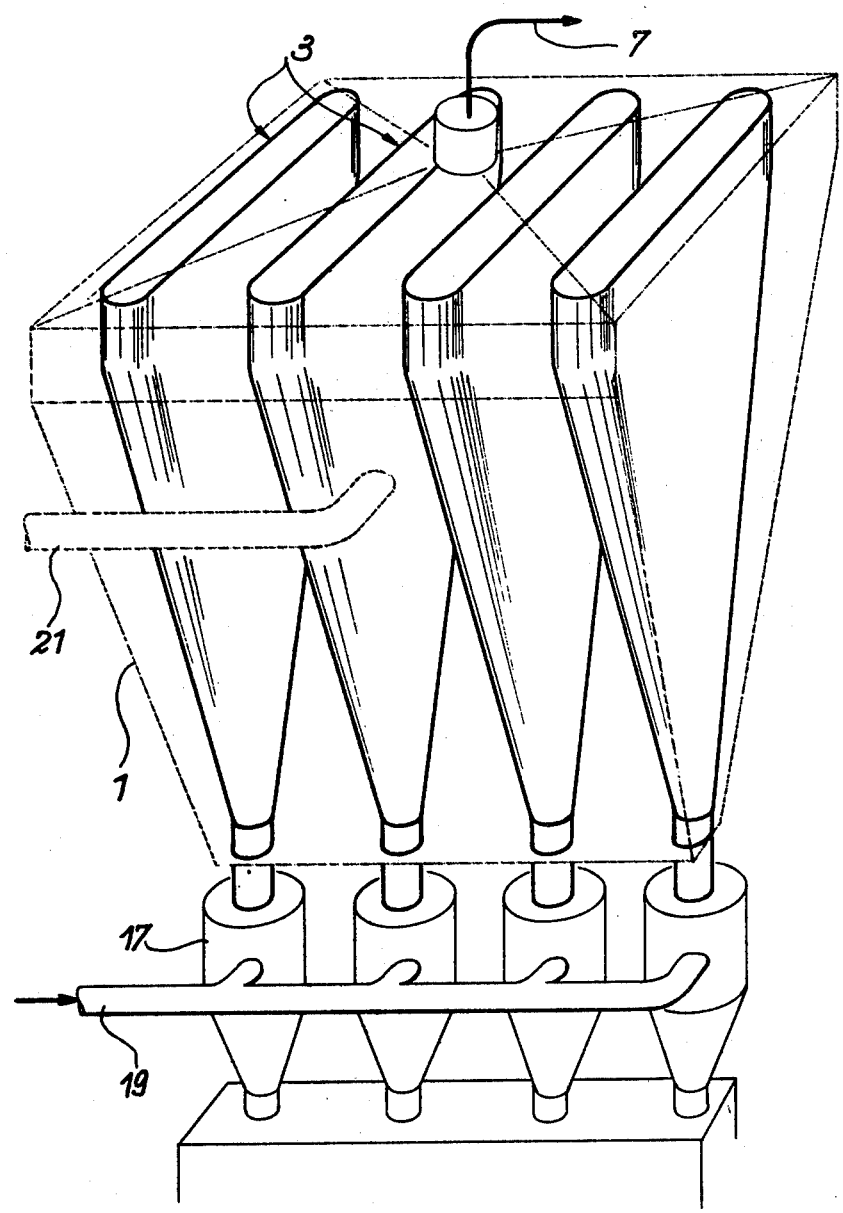
FIG. 5 shows an apparatus according to the invention in which several filter cartridges are arranged in parallel.

FIG. 5 shows an apparatus having a plurality of filter cartridges 3 mounted in parallel in the same enclosure 1, each being associated with a collection tube 17 and a duct 19 for the introduction of the gas transporting the solid product to be separated.

It should be noted that enclosure 1 has a single outlet 7 and two or more ducts 21 (only one of which is visible in the drawing) for introducing a gas counterflow in order to bring about the unclogging of all the filter cartridges.

Figure 6:
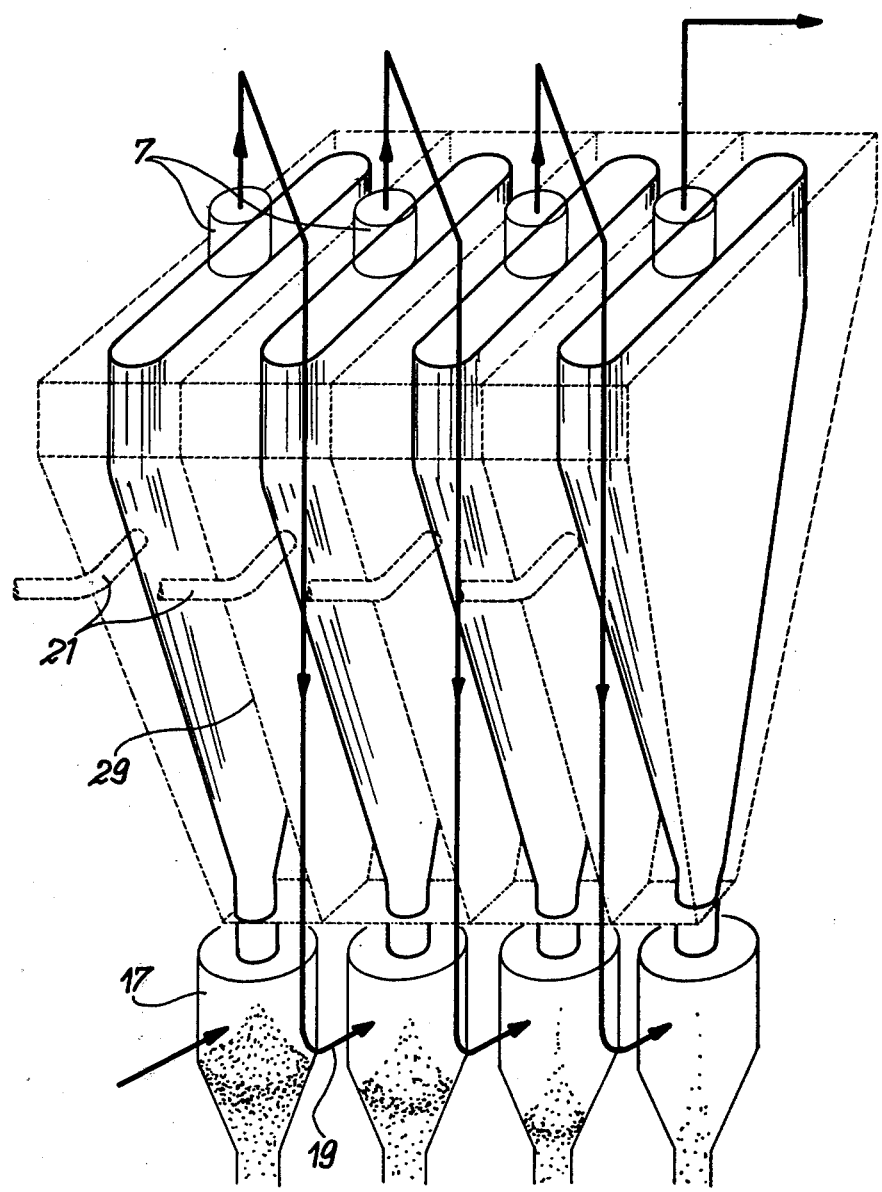
FIG. 6 shows an apparatus according to the invention in which a number of filter cartridges are mounted in series.

FIG. 6 shows an apparatus according to the invention in which a plurality of filter cartridges 3 are mounted in series in an enclosure 1. In this case enclosure 1 is provided with separating members 29 which define a chamber for the collection of the filtered gas around each filter cartridge 3 and these collection chambers are in each case provided with a corresponding outlet 7 and ducts 21 for the introduction of an unclogging gas counterflow.

It should be noted that the outlet 7 of a collection chamber associated with a filter cartridge is connected to the inlet 19 of the following filter cartridge so as to successively pass the gas transporting the solid product to be separated into all the filter cartridges of the apparatus, thus improving the separating efficiency.

The invention is not limited to the embodiments described and represented hereinbefore and various modifications can be made thereto without passing beyond the scope of the invention.

What is claimed is:

1. An apparatus for the separation and recovery of a solid product transported by a gas, comprising at least one filter cartridge made from a rigid porous material mounted in a sealed enclosure and defining in the latter a first filter chamber within the at least one cartridge and which communicates at its lower end with a tube for the collection of the separated solid product and the introduction of the solid product containing gas and a second chamber for the collection of the filtered gas outside the said at least one filter cartridge, the latter having two large-surface opposite porous walls maintained with an appropriate spacing by spacer means fixed on the said walls and disposed in the filter chamber in such a way as to form deflectors so positioned as to aid in dropping of the solid product towards the collection tube, said filter at least one cartridge being shaped in such a manner that said filter chamber has at least in its lower part a cross-section which increases rapidly and regularly from the lower end to the upper end of said lower part, means for introducing the gas transporting the solid product to be separated into said tube, and gas outlet means in said enclosure for extracting the filtered gas from the collection chamber.

2. An apparatus according to claim 1, wherein said apparatus comprises means for introducing a gas into the collection chamber so as to provide the unclogging of the filter cartridge.

3. An apparatus according to claim 1, wherein the opposite porous walls of said at least one filter cartridge are parallel and, at least in their lower parts, are substantially shaped like a triangle whose apex is directed towards the lower end of the at least one cartridge, said walls being interconnected at least on their lateral edges by porous material members.

4. An apparatus according to claim 1, wherein the spacer means comprise an undulating plate provided with openings and which is alternately connected by the apices of said undulations with both the said walls in such a way as to form in the filter chamber channels which extend in a vertical direction.

5. An apparatus according to claim 1, wherein the spacer means comprise an undulating plate having inlets, each undulating plate being alternately connected by the apices of the said undulations with both the walls in such a way as to form in the filter chamber vertically extending channels.

6. An apparatus according to claim 1, wherein the spacer means comprise profiled members mounted between the walls in such a way as to oppose the rising of the solid product in the filter chamber.

7. An apparatus according to claim 6, wherein the said profiled members are shaped like a triangular prism and are arranged in rows between the walls, the members of one row being staggered relative to the members of the adjacent row and each member in one row being oriented in such a way that one of the faces of the prism is surmounted by a ridge.

8. An apparatus according to claim 1, wherein said apparatus comprises a plurality of filter said at least one cartridges mounted in parallel in the enclosure.

9. An apparatus according to claim 1, wherein said apparatus comprises a plurality of said at least one filter cartridges mounted in series in the enclosure, a pluality of separating members positioned within the enclosure so as to define a separate chamber for the collection of the filtered gas around each of said filter cartridges, and means for introducing into the filter chamber defined in one of said filter cartridges the gas extracted from the collection chamber positioned around the preceding cartridge.

* * * * *